(12) United States Patent
Stegmann et al.

(10) Patent No.: US 11,148,308 B2
(45) Date of Patent: Oct. 19, 2021

(54) CLEANING AND CHARGING STATION

(71) Applicant: Braun GmbH, Kronberg (DE)

(72) Inventors: Wolfgang Stegmann, Frankfurt am Main (DE); Bernhard Sikora, Kelkheim (DE); Joachim Krauss, Seeheim-Jugenheim (DE); Uwe Ludaescher, Frankfurt am Main (DE)

(73) Assignee: Braun GMBH, Kronberg (DE)

( * ) Notice: Subject to any disclaimer, the term of this patent is extended or adjusted under 35 U.S.C. 154(b) by 267 days.

(21) Appl. No.: 16/410,162

(22) Filed: May 13, 2019

(65) Prior Publication Data

US 2019/0351567 A1 Nov. 21, 2019

(30) Foreign Application Priority Data

May 15, 2018 (EP) .................................... 18172413

(51) Int. Cl.
*B26B 19/38* (2006.01)
*A45D 27/46* (2006.01)
*F21V 3/02* (2006.01)
*H02J 7/00* (2006.01)
*F21Y 115/10* (2016.01)

(52) U.S. Cl.
CPC ............ *B26B 19/388* (2013.01); *A45D 27/46* (2013.01); *B26B 19/3826* (2013.01); *B26B 19/3833* (2013.01); *F21V 3/02* (2013.01); *H02J 7/0044* (2013.01); *H02J 7/0047* (2013.01); *F21Y 2115/10* (2016.08)

(58) Field of Classification Search
CPC .............. B26B 19/388; B26B 19/3826; B26B 19/3833; A45D 27/46; A45D 27/00; F21V 3/02; F21Y 2115/10; H02J 7/0044; H02J 7/0047; F21W 2131/30
See application file for complete search history.

(56) References Cited

U.S. PATENT DOCUMENTS

| | | | |
|---|---|---|---|
| 7,316,236 B2 * | 1/2008 | Hoser | A45D 27/46 134/135 |
| 7,562,665 B2 * | 7/2009 | Saito | A45D 27/46 134/109 |

(Continued)

OTHER PUBLICATIONS

PCT International Search Report with Written Opinion in corresponding Int'l appln. PCT/IB2019/054023 dated Jun. 18, 2019.

(Continued)

*Primary Examiner* — Peggy A Neils
(74) *Attorney, Agent, or Firm* — Gerd Zetterer; Kevin C. Johnson (57) ABSTRACT

The invention relates to a cleaning and charging station for an electrically driven device. The station comprising an outer housing with a base portion and a gallows structure extending from the base portion. The base portion comprises a cleaning chamber for at least partially receiving the electrically driven device and the gallows structure comprises a charging terminal for charging the electrically driven device. The station further comprises a circuit board mounted within the housing and connected to the charging terminal. The circuit board is located in the gallows structure at a position spaced from the cleaning chamber.

17 Claims, 4 Drawing Sheets

(56) References Cited

U.S. PATENT DOCUMENTS

| | | | | |
|---|---|---|---|---|
| 7,625,451 B2* | 12/2009 | Chasen | ............... | B08B 3/02 |
| | | | | 134/10 |
| 8,505,205 B2* | 8/2013 | Wevers | ............... | B26B 19/3873 |
| | | | | 30/41.5 |
| 9,812,880 B2* | 11/2017 | Maglica | ............... | H02J 7/0047 |
| 2005/0189004 A1* | 9/2005 | Hoser | ............... | A45D 27/46 |
| | | | | 134/111 |
| 2007/0013343 A1 | 1/2007 | Kitamura | | |
| 2008/0284374 A1* | 11/2008 | Gardner | ............... | H02J 7/0044 |
| | | | | 320/115 |
| 2010/0180920 A1* | 7/2010 | Fujimoto | ............... | B26B 19/3833 |
| | | | | 134/184 |
| 2019/0110572 A1* | 4/2019 | Tomaru | ............... | H02J 7/0027 |

OTHER PUBLICATIONS

EP Search Report for 18172413.9, dated Dec. 19, 2018, 7 pages.

\* cited by examiner

CLEANING AND CHARGING STATION

FIELD OF THE INVENTION

The present invention is concerned with a cleaning and charging station for an electrically driven device, for example an electric hair removal device, such as a dry shaver, an electric toothbrush or an electric skin treatment device.

BACKGROUND OF THE INVENTION

Generally, there are at least two types of electric shaver cleaning and battery loading/charging stations are more available at the market and both differ in the way how the shaver is electrically contacted with the station. In a first way the shaver is provided with electrical contacting pins at the lateral housing side which is often the opposite side of the on/off button housing side and the clean and charging station is provided with shaver electrical contacts in an area adjacent to the cleaning chamber. In a second way the shaver electrical socket provided often at the end of the housing opposite to the other end with the cutting units is used as electrical contacting means to contact with the clean and charging station. In order to allow the clean and charging station to electrically connect with the shaver according to the second way the base housing with the cleaning chamber is provided with an extension or projection which looks like a tower which is also often named as "gallow" and which is provided with station electrical contacting means at the free end of the gallow. Said station electrical contacting means of this second way may be provided with a kind of electrical plug to be pushed into the socket of the shaver, so that the shaver is both electrically connected with the station and clamped or fixed within the station.

US 2009 0019 702 A1 discloses a cleaning station for an electrical shaver comprising a housing with a base, a cleaning chamber and a gallows structure, i.e. a support member, to support and hold a connected shaver in an upside down position and either displace the shaver into a cleaning liquid or displace the shaver out of the cleaning liquid to start a drying process. A control unit of this station is located in the vicinity of the cleaning chamber. There is a risk that the cleaning liquid comes in contact with the control unit, which may result in a malfunction of the station.

EP 2 308 338 A2 discloses a cleaning and charging station comprising a housing and a basin with a cleaning chamber. A dry shaver can be inserted into the cleaning chamber. Several electrical components are arranged in the vicinity of the cleaning chamber, such that there is a risk of malfunction of these components if they come in contact with the cleaning liquid.

SUMMARY OF THE INVENTION

It is an object of the present disclosure to provide a cleaning and charging station minimizing the risk of malfunction of electrical components due to exposure to cleaning liquid.

This object is solved by a cleaning and charging station as defined in claim 1. In accordance with one aspect there is provided a cleaning and charging station comprising a housing with a base portion and a gallows structure extending from the base portion. The base portion comprises a cleaning chamber for at least partially receiving the electrically driven device and the gallows structure comprises a charging terminal for charging the electrically driven device. Further, the circuit board is located in the gallows structure at a position spaced from the cleaning chamber. Arranging the circuit board at a position remote from the cleaning chamber, the risk of exposing the circuit board to the cleaning liquid is minimized. The location of the circuit board in the gallows structure has the further benefit that the circuit board is at a position in the vicinity of components connected and/or coupled to the circuit board, thereby potentially avoiding or at least reducing cables or wiring. For example, a lighting unit, a display unit, a selector for choosing an operation mode or status of the station and/or a start button may be provided directly on the circuit board or at least in the vicinity of the circuit board.

BRIEF DESCRIPTION OF THE DRAWINGS

FIG. 2b shows an exploded view of the lighting unit of FIG. 2a;

DETAILED DESCRIPTION OF THE INVENTION

Before describing advantageous embodiments of the invention related to the embodiments depicted in FIGS. 1 to 5, different aspects of the invention are described more in detail. These aspects disclose further features, advantages and possibilities of use of the present invention that might be combined in any useful combination. All features described and/or shown in the drawings are subject matter of the invention, irrespective of the grouping of the features in the claims and/or their back references.

According to an aspect of the present disclosure, the base portion 2 comprises a support face 2A located on a vertically lower side during use of the station and a collar 2B located opposite the support face. The gallows structure may extend from the collar of the base portion in a direction facing away from the support face. In other words, the gallows structure with the circuit board are located vertically above the base portion with the cleaning chamber during use of the cleaning and charging station.

For example, the cleaning chamber has an open side allowing insertion of the electrically driven device or at least a portion thereof. This open side preferably faces away from the support face and is arranged between the support face and the collar. According to the present disclosure the circuit board may be located in the gallows structure at a position spaced from the collar of the base portion.

According to a further aspect of the present disclosure, the gallows structure may be provided with at least one lighting unit connected to a circuit board and having at least one light-emitting source optically connected to at least one light-diffusing element. The circuit board is mounted within the housing and connected to the charging terminal. The light-emitting source and the light-diffusing element may either be optically connected by an intermediate piece, such as a light guide, to each other or through a direct connection, such as mounting the light-emitting source directly to the light-diffusing element.

The at least one lighting unit is capable of providing a feedback signal to the user of the cleaning and charging station, for example regarding the operation mode or status of the station. This may include a feedback of the charging and cleaning status of said electrically driven device, e.g. a dry or wet shaver. By providing the at least one lighting unit in or on the gallows structure, visibility of the lighting unit is improved. Especially, arranging the at least one lighting unit in or on the gallows structure permits unshielded view on the at least one lighting unit from different sides and angles.

The lighting unit of the charging and cleaning station may further comprise a light guide optically interposed between the at least one light-emitting source and the at least one light-diffusing element. This light guide may optically connect at least one light-emitting source with at least one light-diffusing element such that light emitted from the light source is transmitted into the light-diffusing element. The light guide may be made of a fully- or semi-transparent material and may comprise defined discontinuities on the surface to efficiently transmit light to the light-diffusing elements. in an example, the light guide and/or the light-diffusing element is/are provided with defined discontinuities in the form of steps, a knurling, a corrugation, a fluting or the like for transmitting light from the light guide into the at least one light-diffusing element. The light guide may be in direct contract with the at least one light-diffusing element with the surface of the light guide contacting the at least one light-diffusing element. Providing a light guide permits transmitting light from a potentially remote light source to the at least one light-diffusing element. This allows placing the light source and the at least one light-diffusing element at ideal positions regarding visibility of the at least one light-diffusing element and/or building space for the light source and its electrical connectors.

In a preferred form, the at least one light-diffusing element is a ring provided in and/or on the gallows structure, preferably at an end of the gallows structure facing away from the base portion. Thus, the at least one light-diffusing element is visible from all sides of the cleaning and charging station. The light guide may be substantially ring-shaped to fit to a ring-shaped portion of the light-diffusing element. Furthermore, the light guide may comprise at least one arm, preferably two arms spaced from each other that is/are optically connected to at least one respective light-emitting source. The at least one arm may guide light from a potentially remote light source to ring-shaped portion of the light guide abutting the light-diffusing element.

The at least one light-diffusing element may contain, at least partly, light scattering inorganic and/or organic particles, preferably titanium dioxide ($TiO_2$). This results in light scattering or light diffusion such that the light-diffusing element generates a visible feedback to the user and softened emitted light.

The light-emitting source may comprise at least one light emitting diode, preferably at least one RGB light emitting diode, provided on the circuit board within the housing. The use of at least two RGB light-emitting diodes allows the display of the full range of the visible light spectrum to visualize varying operating modes. Thus different light colors may be displayed for indicating different modes of the station. In an example the station comprises two RGB light emitting diodes arranged spaced from each other on the circuit board and optically connected to the light-diffusing element by means of a light guide with two arms, wherein each arm is assigned to one of the RGB light emitting diodes.

To connect the elements of the lighting unit to each other and fix the light guide and/or the light-diffusing element to the gallows structure, a cover element may be utilized. In more detail, the cover element is preferably ring-shaped and can be received by a recess within the light-diffusing element. Locking hooks on one end of the cover element may interlock the light guide and the light-diffusing element to the gallows structure. In addition, the cover element may be used to cover any undesirable elements and partly shield the light-diffusing element. The cover element may also fix further component parts on the gallows structure.

Additionally, the lighting unit comprises a button for activating the cleaning and charging station. The button may be provided with locking hooks to connect to the cover element through recesses within the cover elements structure. A set of eyelets on the buttons side may be provided to connect to the gallows structure. The button may be at least partially surrounded by the at least one light-diffusing element. In an embodiment, the button is displaceable relative to the light-diffusing element.

The gallows structure of the cleaning and charging station may comprise a recess for at least partially receiving the electrically driven device, e.g. a dry or wet shaver or an epilating device. Within the recess, e.g. at the end of the gallows structure facing away from the base portion, the charging terminal is provided to charge the electrically driven device. In other words, the electrically driven device may be received in the shell-like gallows structure for cleaning and charging. In addition, the electrically driven device may partially immerse in the cleaning chamber of the base portion.

Furthermore, a display unit for indicating different operation modes of the cleaning and charging station may be provided within the recess of the gallows structure. This unit may indicate different operation modes of the cleaning and charging station e.g. via separate illuminated icons, which may be selected by a separate selector, e.g. a button, within the display unit. The display unit and the selector are connected to the circuit board that is located within the gallows structure.

In addition, the circuit board is preferably adapted such that the at least one lighting unit emits different optical feedback signals. These signals may indicate different operation modes of the cleaning and charging station and/or different states of the electrically driven device. The circuit board may be further adapted for different cleaning programs, e.g. with a delayed start. For example, the circuit board is provided with a program adapted such that in use, before putting the shaver in the cleaning center, the desired operation mode has to be chosen by pressing the separate selector, e.g. several times to switch between different operation modes. The chosen operation mode may be displayed via illuminated symbols on the display unit. Pressing the start button then starts the selected operation mode and this may be indicated by the light ring by means of a certain color associated to the respective mode or state. For example, a blue light may indicate cleaning of the shaver, a green light may indicate charging, a yellow light may indicate a low cleaning cartridge level and/or a red light may indicate that the cleaning cartridge is empty.

Figure 3:
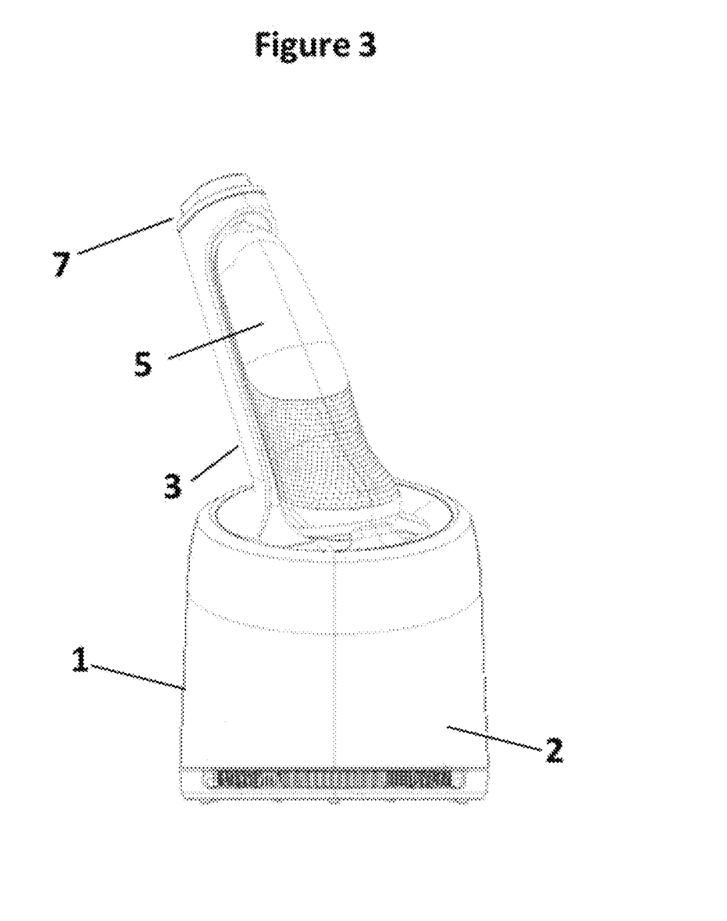
FIG. 3 shows a perspective view of the cleaning and charging station of FIG. 1 together with an electrically driven device.
Figure 4A:
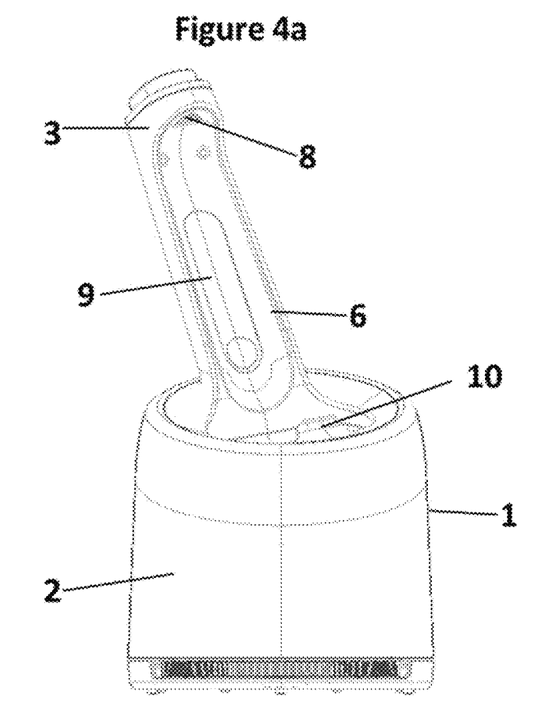
FIG. 4a shows a perspective view of the cleaning and charging station of FIG. 1 without an electrically driven device.
Figure 4B:
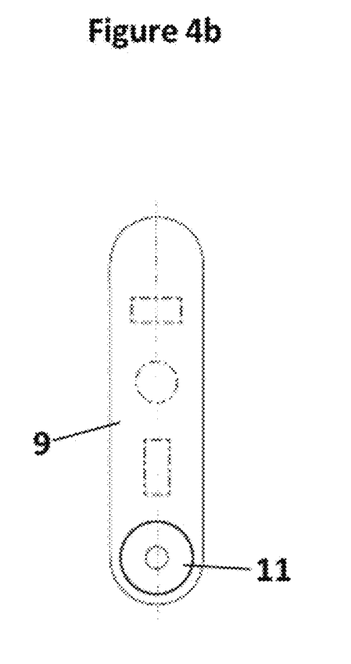
FIG. 4b shows a portion of the cleaning and charging station of FIG. 1 with a display unit and a selector.
Figure 5:
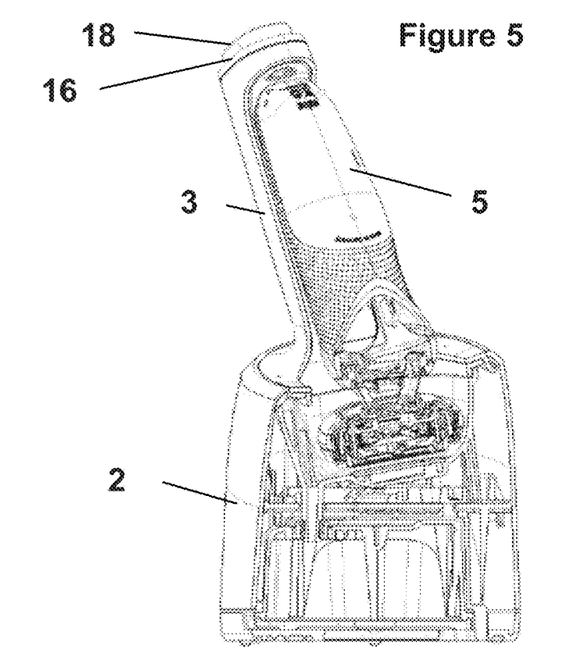
FIG. 5 shows a sectional view of FIG. 3.

Turning now to the embodiment depicted in FIGS. 1 to 5, the charging and cleaning station and its main component parts is shown. In the embodiment depicted in FIG. 1, the charging and cleaning station comprises a housing 1 with a base portion 2 and a gallows structure 3. The base portion 2 comprises a recess forming a cleaning chamber 4. The cleaning chamber 4 is designed to fit to an electrically driven device, e.g. the shaving head of an electrical shaver 5, which may be at least partially immersed in a cleaning fluid in the cleaning chamber 4 (FIG. 5).

Figure 1:
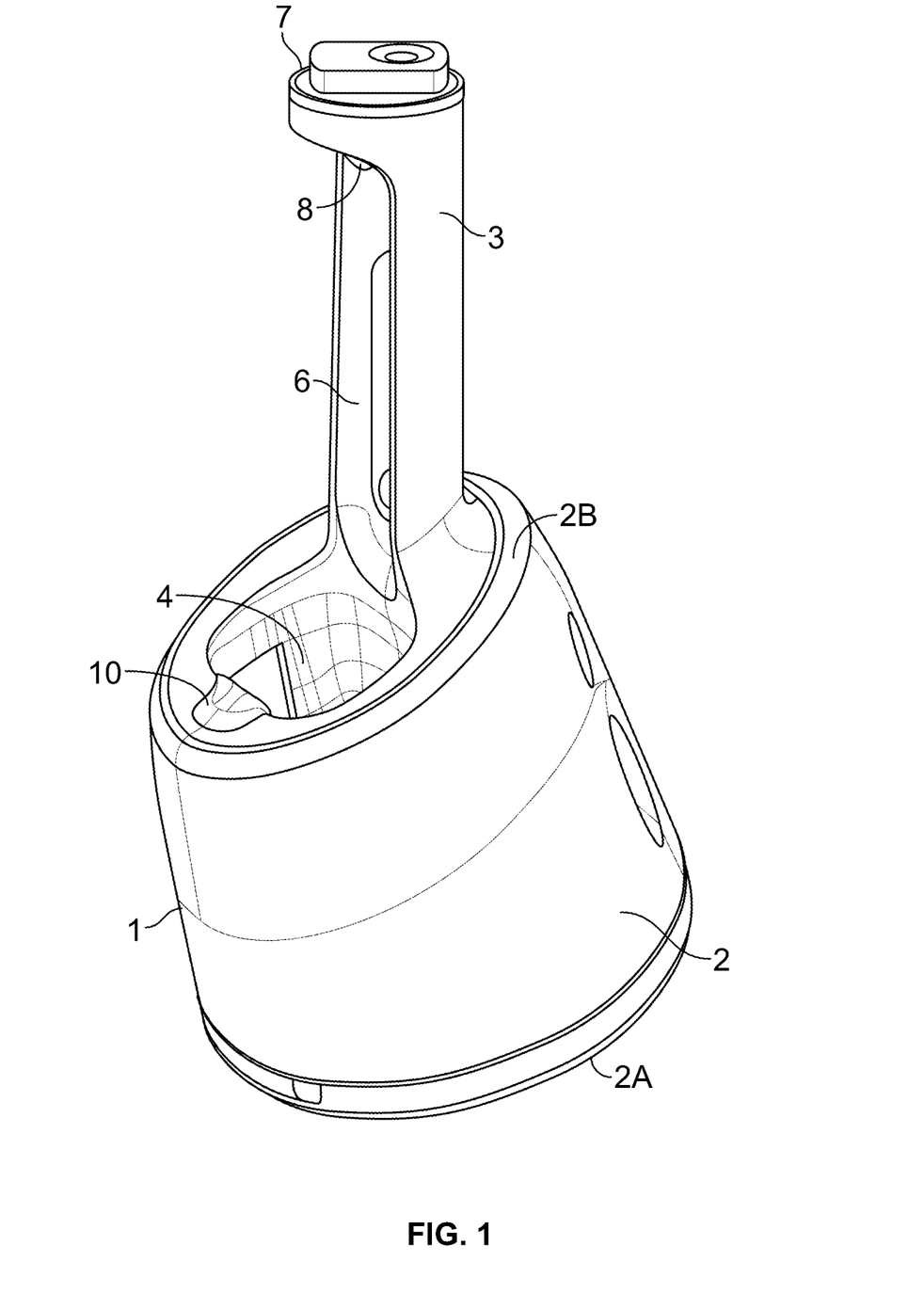
FIG. 1 shows an isometric view of a cleaning and charging station according to an embodiment of the invention.

The gallows structure 3 protrudes from the base portion 2 of the housing 1 as depicted in FIG. 1. The gallows structure 3 is provided with an internal recess 6 such that the gallows structure 3 has, at least partially, a shell-like configuration. The electrically driven device 5 may be placed in the recess 6 of the gallows structure 3 as shown in FIGS. 3 and 5. In other words, the electrically driven device 5 is placed upside down in the charging and cleaning station partially received in the recess 6 of the gallows structure 3 and partially immersed into the cleaning chamber 4.

The base portion 2 of the cleaning and charging station may also be displaced from a first position to a second position via a displacing system (not shown) to insert a cleaning cartridge (not shown) containing a cleaning fluid used for the cleaning process (not shown) of the shaver 5.

The gallows structure 3 comprises lighting unit 7 at the end of said structure, a charging terminal 8 and a display unit 9 which is shown in more detail in FIGS. 4a and 4b. The gallows structure 3 exhibits two inclinations and a rotation relative to the base portions 2 vertical axis as depicted in FIGS. 1, 3, 4a and 5. The first inclination of the said structure 3 is backwards relative to the vertical axis of the base portion 2 between 15° and 40°, preferably between 20° and 30°. This allows for a parallel position of the shaver's head compartment of an electrical shaver 5 within the cleaning chamber to the level of cleaning fluid which is needed for an optimal cleaning process. The gallows structure 3 is also inclined between 5° and 20°, preferably about 10°, to the left (as seen in FIG. 3) relative to the vertical axis of the base portion 2. This setup ensures a sufficient flow of the cleaning fluid during the cleaning process of an inserted electrical shaver 5. Furthermore, the gallows structure 3 in this preferred embodiment displays a counterclockwise rotation between 15° and 45° relative to the vertical axis of the base portion 2, preferably 25° to 35°, which in combination with the two aforementioned inclinations of the gallows structure 3 is beneficial to the drying process of the electrical shaver 5 as remaining cleaning fluid on the shaver's head compartment is drained more efficiently.

FIG. 4a depicts a perspective view of the cleaning and charging station without an electrical shaver 5. The charging terminal 8 is located at the top side of the recess 4 of the gallows structure 3, i.e. facing away from the base portion 2. An electrical shaver 5 can be placed upside down within the recess 4 to get charged by the charging terminal 8 and is held in place by a stopper 10 on the housing 1. Inset within the gallows recess 4 is the display unit 9 which is used for a manual preselection of different cleaning and/or charging options for the electrical shaver 5.

FIG. 4b illustrates a front view of the aforementioned display unit 9 in more detail. The display unit 9 comprises illuminated indicators (shown in dashed lines), e.g. symbols, for optical feedback which correspond to a desired operation mode selected manually via a selector 11. In other words, the selector 11 is used to choose between several different operation modes of the cleaning and charging station, for example an operation mode for immediate start of the cleaning process or an operation mode for a delayed start of the cleaning process. The selection of the respective operation mode is indicated by the respective symbols in the display unit 9. The location of the display unit 9 and the selector 11 is depicted in the exemplary embodiment shown in the Figures such that selection of the respective operation mode has to be performed prior to inserting the electrically driven device 5 into the recess 6 of the gallows structure 3. However, in a not shown alternative embodiment the display unit 9 and/or the selector 11 may be located such that the display unit 9 is visible and/or the selector 11 is operable with the electrically driven device 5 inserted into the recess 6.

In FIG. 3 the cleaning and charging station is shown with the electrically driven device 5 received within the gallows structure's recess 6. By placing said device 5 upside down into the station, the head of the device is situated inside the cleaning chamber 4 while the other end of the device is connected to the charging terminal 8 below the lighting unit 7. Charging of the electrically driven device 5 which preferably comprises a rechargeable battery may start immediately when connecting the charging terminal 8 to the electrically driven device 5. As an alternative, it may be required that a user starts the charging process, e.g. by selecting a respective operation mode and/or by pressing the start button.

Figure 2A:
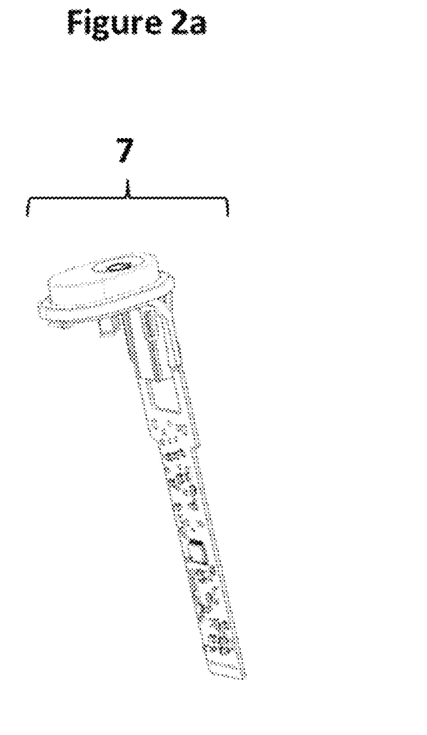
FIG. 2a shows the lighting unit of the cleaning and charging station of FIG. 1.
Figure 2B:
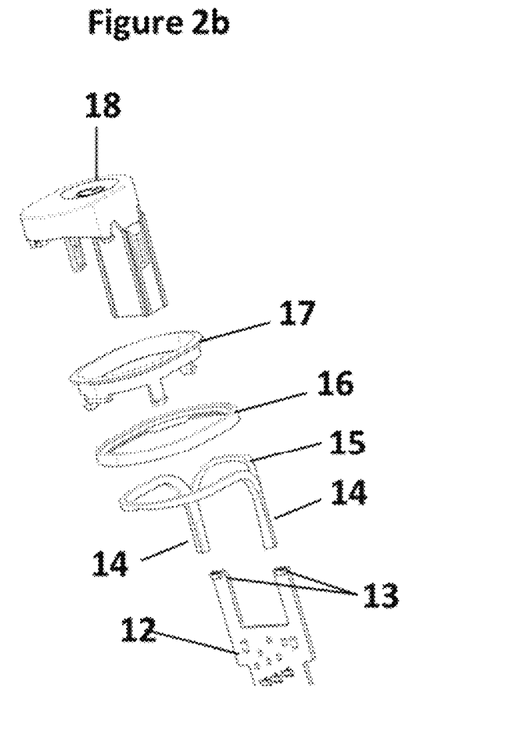

The lighting unit 7 is depicted in FIGS. 2a and 2b in more detail. While FIG. 2a shows the assembled lighting unit 7, FIG. 2b demonstrates an exploded view of the main component parts of the lighting unit 7. A circuit board 12 is mounted to the gallows structure 3 and is connected to the charging terminal 8. In other words, the circuit board 12 is arranged within the charging and cleaning station at a position above the base portion 2 with the cleaning chamber 4. This has the benefit that the risk of exposing the circuit board 12 to the cleaning liquid is significantly reduced. Preferably, the circuit board 12 is located within the gallows structure 3 in the vicinity of the display unit 9 and the selector 11 such that light emitting elements and/or a push button or switch assigned to the selector 11 may be placed directly on the circuit board 12.

The circuit board 12 is suitable and adapted to perform and/or control several operations of the charging and cleaning station, especially controlling a cleaning process and/or controlling a charging process in response to signals from the selector 11 and/or a separate start button 18. In addition, the circuit board 12 is suitable and adapted to control provision of feedback signals to the user by means of the lightning unit 7 and/or the display unit 9. The circuit board 12 may be suitable to perform and/or control additional functions, e.g. providing different types of feedback signals including an acoustic feedback signal.

The circuit board 12 is provided with two light-emitting sources 13 which are incorporated at the upper end of the circuit board 12 (as seen in FIGS. 2a and 2b) and are preferably two RGB light-emitting diodes to produce the full spectrum of visible light. As an alternative to the exemplary embodiment depicted in the Figures, a single light-emitting source 13 may be provided on the circuit board 12 or further light-emitting sources may be provided. In the depicted embodiment the circuit board 12 further comprises at least one light-emitting source assigned to the display unit 9.

Through light guide arms 14 the light-emitting sources 13 are optically connected to a highly transparent light guide unit 15. This guide element features defined discontinuities on the surface facing towards a light-diffusing element 16 for an optimal transmission of the emitted light of the light sources 13 to the light-diffusing element 16. Provision of the light guide unit 15 with its guide arms 14 as of the benefit that the two light-emitting sources 13 may be provided on the circuit board 12 while the light-diffusing element 16 is located remote from the circuit board 12. In addition, no cables or the like are required between the circuit board 12 and the light-diffusing element 16.

The light guide 15 and the light-diffusing element 16 are at least partially ring-shaped. The light guide 15 may be connected to a recess in the ring structure of the light-diffusing element 16. In order to fix the light guide 15 and the light-diffusing element 16 to the gallows structure 3, a ring-shaped cover element 17 may be placed on the light-diffusing element 16 connecting the aforementioned units e.g. via engagement hooks. Further, the cover element 17 may shield or cover portions of the light-diffusing element 16.

The ring-shaped form of the lighting unit 7 as depicted in the Figures is an exemplary embodiment of the design of the lighting unit and the light-diffusing element 16. However, the present disclosure is not limited to only ring-shapes and can be any arbitrary shape as long as the elements are located in and/or on the gallows structure 3 such that they are visible from different positions and angles.

The top of the lighting unit 7 is provided with the button element 18 that may physically lock into the cover element 17 through engagement hooks. Pressing the button 18 either activates or deactivates the cleaning and charging station which is indicated by the lighting unit's 7 optical feedback.

A charging and cleaning process may be started by a user by selecting an operation mode by pressing the selector 11. The selected operation mode may be indicated on the display unit 9. After placing the electrically driven device 5 into the charging and cleaning station the respective process is initiated by pressing the button 18. As the electrically driven device 5 shields the display unit 9 when placed in the charging and cleaning station, a visual feedback provided by the display unit 9 may be impeded. However, the lighting unit 7 provides an additional visual feedback to the user corresponding to the selected operation mode of the charging and cleaning station and/or corresponding to the status of the charging and cleaning station. Thus, even with the display unit 9 being shielded by the electrically driven device 5, a user gets feedback regarding the process performed by the charging and cleaning station. The visual feedback provided by the lighting unit 7 may be in the form of different colors associated to a respective status and/or a respective operation mode of the charging and cleaning station. In addition or as an alternative, the status and/or an operation mode of the charging and cleaning station may be indicated by emitting permanent light and/or by emitting interrupted light, e.g. a blinking light.

According to an embodiment of the present disclosure the charging and cleaning station is combined with an electrically driven device 5 which is an electric shaver, preferably a dry shaver or of the shaver. For example, the charging and cleaning station is adapted to the electrically driven device 5 regarding size and shape of the electrically driven device, regarding the connection of the shaver head to the device and/or regarding the position of the charging terminal 8. The electrically driven device may be a shaver with a pivotable and/or tiltable shaver head. The shaver head may comprise a stationary foil type cutter unit with a cutter blade linearly movable with respect to the stationary foil type cutter unit.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

REFERENCE NUMERALS 1 housing
2 base portion
3 gallows structure
4 cleaning chamber
5 electrically driven device
6 gallows structure recess
7 lighting unit
8 charging terminal
9 display unit
10 stopper
11 selector
12 circuit board
13 light-emitting source
14 light guide
15 light guide arm
16 light-diffusing element
17 cover element
18 button

What is claimed is:

1. A cleaning and charging station for an electrically driven device, the station comprising an outer housing with a base portion and a gallows structure extending from an upper collar of the base portion, the base portion comprising a cleaning chamber for at least partially receiving the electrically driven device and the gallows structure comprising a charging terminal for charging the electrically driven device, and a circuit board mounted within the housing and connected to the charging terminal, wherein the circuit board is located in the gallows structure at a position spaced from the cleaning chamber.

2. The cleaning and charging station according to claim 1, wherein the base portion comprises a support face located on a vertically lower side during use of the station and the upper collar located opposite the support face, wherein the gallows structure extends from the upper collar of the base portion in a direction facing away from the support face.

3. The cleaning and charging station according to claim 2, wherein the cleaning chamber has an open side for at least partially receiving the electrically driven device, which open side faces away from the support face and which is arranged between the support face and the upper collar.

4. The cleaning and charging station according to claim 2, wherein the circuit board is located in the gallows structure at a position spaced from the upper collar of the base portion.

5. The cleaning and charging station according to claim 1, wherein the circuit board is connected to at least one lighting unit which comprises at least one light-emitting source optically connected to at least one light-diffusing element.

6. The cleaning and charging station according to claim 5, wherein the lighting unit further comprises a light guide optically interposed between the at least one light-emitting source and the at least one light-diffusing element.

7. The cleaning and charging station according to claim 5, wherein the at least one light-diffusing element is a ring provided on the gallows structure.

8. The cleaning and charging station according to claim 5, wherein the light-emitting source comprises at least one light emitting diode provided on the circuit board within the housing.

9. The cleaning and charging station according to claim 5, wherein the lighting unit further comprises a button for activating the cleaning and charging station, wherein said button is at least partially surrounded by the at least one light-diffusing element.

10. The cleaning and charging station according to claim 1, wherein the gallows structure comprises a recess for at least partially receiving the electrically driven device.

11. The cleaning and charging station according to claim 10, wherein the charging terminal for charging the electrically driven device is provided within the recess of the gallows structure.

12. The cleaning and charging station according to claim 10, wherein the circuit board is connected to a display unit for indicating different operation modes of the cleaning and charging station wherein the display unit is located on the gallows structure.

13. The cleaning and charging station according to claim 12, wherein the display unit is provided in the recess of the gallows structure.

14. The cleaning and charging station according to claim 1, wherein a selector for selecting different operation modes of the cleaning and charging station is connected to the circuit board and provided on the gallows structure.

15. The cleaning and charging station according to claim 5, wherein the circuit board is adapted such that the at least one lighting unit emits different optical feedback signals, wherein the feedback signals are indicative of different operation modes of the cleaning and charging station and different states of the electrically driven device.

16. The cleaning and charging station according to claim 1, wherein at least one of a lighting unit, a display unit, a selector for choosing an operation mode or status of the station or a start button is located on the gallows structure and provided directly on the circuit board.

17. The cleaning and charging station according to claim 1, wherein the circuit board is arranged at a position above the base portion.

* * * * *